US011804087B2

(12) United States Patent
Fuke et al.

(10) Patent No.: US 11,804,087 B2
(45) Date of Patent: Oct. 31, 2023

(54) INFORMATION PROCESSING DEVICE, VEHICLE, INFORMATION PROCESSING METHOD, AND NON-TRANSITORY RECORDING MEDIUM IN WHICH COMPUTER PROGRAM IS RECORDED

(71) Applicant: TOYOTA JIDOSHA KABUSHIKI KAISHA, Toyota (JP)

(72) Inventors: Jumpei Fuke, Toyota (JP); Kuniharu Tsuzuki, Handa (JP); Shota Honda, Miyoshi (JP); Shimpei Asai, Okazaki (JP); Nobuyoshi Nagai, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/944,756

(22) Filed: Sep. 14, 2022

(65) Prior Publication Data

US 2023/0080147 A1     Mar. 16, 2023

(30) Foreign Application Priority Data

Sep. 16, 2021   (JP) .................................. 2021-151412

(51) Int. Cl.
*G07C 9/00*   (2020.01)
*H04B 17/318*   (2015.01)

(52) U.S. Cl.
CPC ....... *G07C 9/00309* (2013.01); *H04B 17/318* (2015.01)

(58) Field of Classification Search
None
See application file for complete search history.

(56) References Cited

U.S. PATENT DOCUMENTS

| 10,083,555 | B2 * | 9/2018 | Woo .................... G07C 9/00309 |
| 11,659,584 | B2 * | 5/2023 | Yang ................. H04W 28/0236 370/252 |
| 2014/0228058 | A1 * | 8/2014 | Ji ......................... G01S 5/02521 455/456.5 |
| 2017/0249791 | A1 * | 8/2017 | Woo ....................... B60R 25/24 |
| 2017/0277479 | A1 * | 9/2017 | Goto .................... H04B 17/318 |
| 2018/0115874 | A1 * | 4/2018 | Kim ....................... G01C 25/00 |
| 2018/0328744 | A1 * | 11/2018 | Miyake ................ G08G 1/0129 |
| 2019/0219398 | A1 * | 7/2019 | Sun ......................... G01C 21/10 |
| 2019/0265916 | A1 * | 8/2019 | Goto ........................ G06F 3/121 |
| 2022/0353878 | A1 * | 11/2022 | Yang .................... H04B 17/309 |

FOREIGN PATENT DOCUMENTS

JP     2017-175467 A     9/2017

* cited by examiner

*Primary Examiner* — Carlos Garcia
(74) *Attorney, Agent, or Firm* — Oliff PLC

(57) ABSTRACT

An information processing device utilizable as a digital key for a vehicle, the information processing device includes a memory; and a processor coupled to the memory. The processor is configured to in a case in which the processor does not have signal strength correction value information corresponding to a model of the information processing device, the correction value information being used by the vehicle when determining a distance between the vehicle and the information processing device in processing pertaining to the digital key for the vehicle, acquire the correction value information from a server device, and send the acquired correction value information to the vehicle.

14 Claims, 13 Drawing Sheets

INFORMATION PROCESSING DEVICE, VEHICLE, INFORMATION PROCESSING METHOD, AND NON-TRANSITORY RECORDING MEDIUM IN WHICH COMPUTER PROGRAM IS RECORDED

CROSS-REFERENCE TO RELATED APPLICATION

This application is based on and claims priority under 35 USC 119 from Japanese Patent Application No. 2021-151412 filed on Sep. 16, 2021, the disclosure of which is incorporated by reference herein.

BACKGROUND

Technical Field

The present disclosure relates to an information processing device, a vehicle, an information processing method, and a non-transitory recording medium in which computer program is recorded.

Related Art

There is a technology that determines, based on the signal strength of radio waves sent by a mobile device, the distance to the mobile device and executes a predetermined process based on the result of the determination. In the execution of the process, the distance to the mobile device needs to be determined accurately. For example, Japanese Patent Application Laid-open (JP-A) No. 2017-175467 discloses a technology relating to a communication device that identifies the signal strength of a packet it has received and uses the signal strength to execute a process, wherein the communication device receives a packet sent by an external device, decides a correction value for the signal strength of the packet based on model information of the external device, and uses the correction value it has decided to correct the signal strength of the packet.

Because of performance differences by model of mobile devices, even if mobile devices send radio waves using the same settings, their signal strengths are not invariably identical. Thus, when accurately determining the distance between devices based on signal strength, it becomes necessary to correct the signal strength according to performance differences by model of mobile devices. In the technology disclosed in JP-A No. 2017-175467, an information processing device stores beforehand correction value information corresponding to models. However, in the case of installing an application in an information processing device such as a smartphone and utilizing the information processing device as a digital key for a vehicle, it is difficult for the information processing device to store beforehand all correction value information by model because there are numerous models of information processing devices.

SUMMARY

An aspect of the disclosure is an information processing device utilizable as a digital key for a vehicle. The information processing device includes a memory, and a processor coupled to the memory, the processor being configured to in a case in which the processor does not have signal strength correction value information corresponding to a model of the information processing device, the correction value information being used by the vehicle when determining a distance between the vehicle and the information processing device in processing pertaining to the digital key for the vehicle, acquire the correction value information from a server device, and send the acquired correction value information to the vehicle.

BRIEF DESCRIPTION OF THE DRAWINGS

Exemplary embodiments of the present disclosure will be described in detail based on the following figures, wherein.

DETAILED DESCRIPTION

Figure 1:
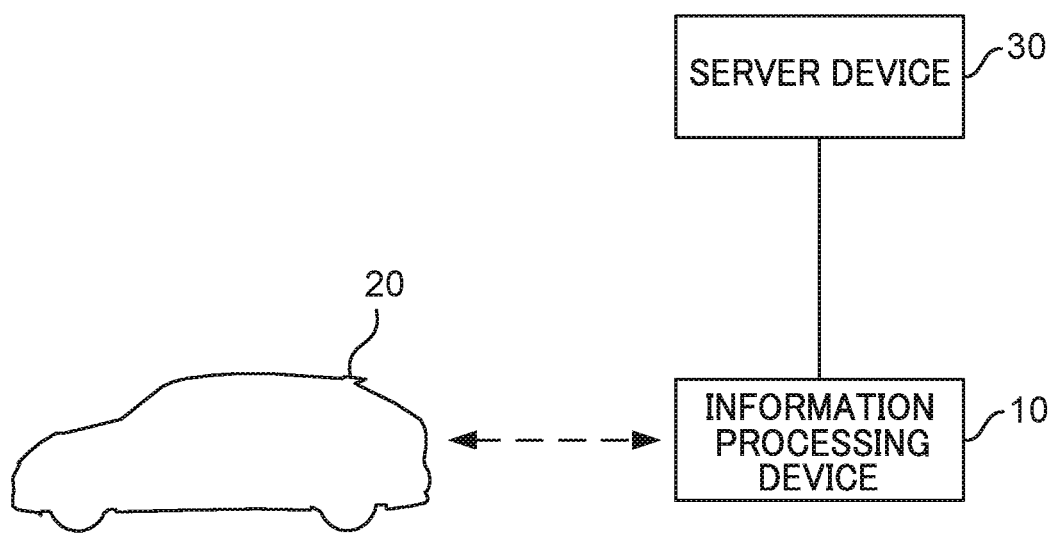
FIG. 1 is a diagram showing the schematic configuration of an example of a vehicle control system pertaining to a first embodiment of the technology of the disclosure.

Exemplary embodiments of the present disclosure will be described below with reference to the drawings. It will be noted that identical or equivalent constituent elements and parts are assigned identical reference signs in the drawings. Furthermore, dimensional ratios in the drawings may be exaggerated for convenience of description and differ from actual ratios.

First Embodiment (System Configuration)

FIG. 1 is a diagram showing the schematic configuration of a vehicle control system 1 pertaining to a first embodiment of the disclosure. The vehicle control system 1 shown in FIG. 1 is configured to include an information processing device 10, a vehicle 20, and a server device 30.

The information processing device 10 is a mobile device such as a smartphone, for example, and is a device utilizable as a digital key for unlocking the doors of the vehicle 20 and starting the engine. The information processing device 10 becomes utilizable as a digital key for the vehicle 20 by downloading and installing an application for allowing the information processing device 10 to function as a digital key. In the present embodiment, "the information processing device 10 becomes utilizable as a digital key for the vehicle 20" means that the information processing device 10 holds key information for the vehicle 20.

The vehicle 20 pertaining to the present embodiment performs near-field wireless communication with the information processing device 10 functioning as a digital key for the vehicle 20 and executes a process pertaining to the digital key. In the present embodiment, the information processing device 10 and the vehicle 20 perform wireless communication based on the Bluetooth (registered trademark) Low Energy (BLE) standard as the near-field wireless communication standard. As the process pertaining to the digital key, the vehicle 20 judges whether or not the information processing device 10 utilizable as a digital key for the vehicle 20 is within a predetermined distance from the vehicle 20. The vehicle 20 determines whether or not the information processing device 10 is within the predetermined distance from the vehicle 20 using the signal strength of radio waves sent by the information processing device 10. Whether or not the information processing device 10 is within the predetermined distance is, in the present embodiment, also called an operating area determination process.

The server device 30 holds signal strength correction value information set by model of the information processing device 10. As described above, the vehicle 20 determines the distance to the information processing device 10 using the signal strength of the radio waves sent by the information processing device 10 in the operating area determination process. However, in a case where the information processing device 10 such as a smartphone functions as a digital key, even if the information processing device 10 sends radio waves using the same settings, the signal strength of the radio waves will not invariably be identical because of performance differences by model of the information processing device 10.

Thus, the server device 30 stores, by model of the information processing device 10, correction value information decided beforehand by, for example, measuring signal strengths. The information processing device 10 can download from the server device 30 the signal strength correction value information that has been set by model. The information processing device 10 sends the correction value information it has downloaded from the server device 30 to the vehicle 20. The vehicle 20 executes the operating area determination process using the correction value information sent from the information processing device 10.

According to the present embodiment, the information processing device 10 acquires the correction value information corresponding to its own model from the server device 30 and sends the correction value information it has acquired to the vehicle 20, whereby the information processing device 10 can allow the vehicle 20 to accurately execute the operating area determination process. Furthermore, the information processing device 10 can allow the vehicle 20 to accurately execute the operating area determination process without the need to store beforehand correction value information by model including even correction value information not corresponding to its own model.

(Configurations)
(Information Processing Device)

Figure 2:
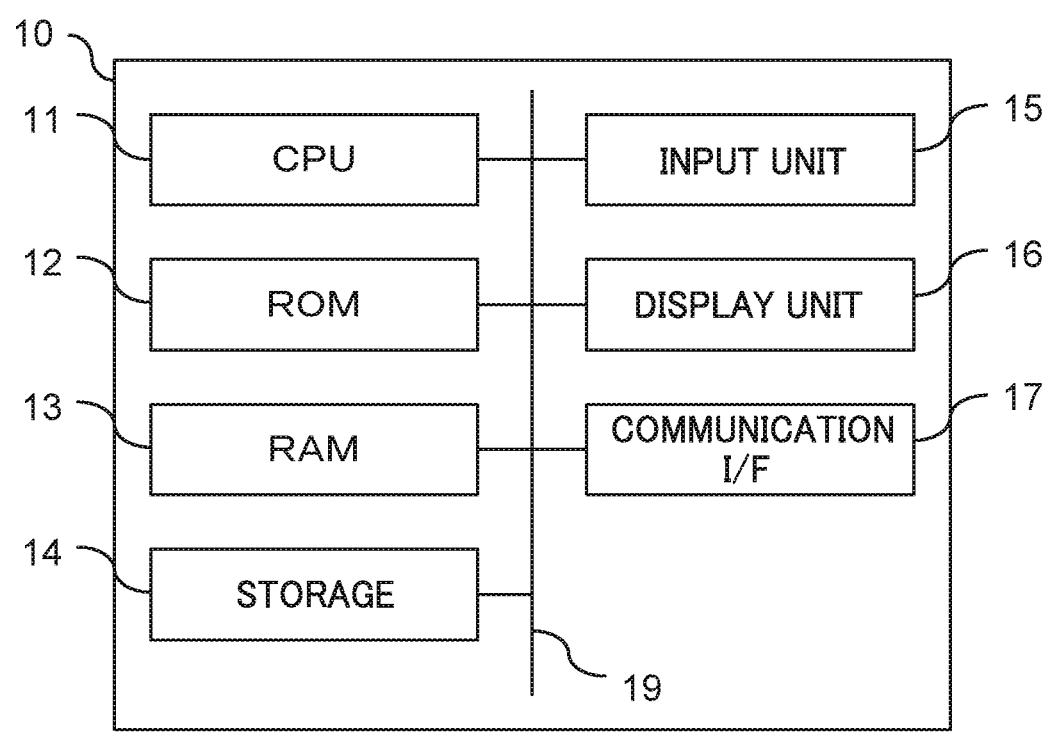
FIG. 2 is a block diagram showing an example of hardware configurations of an information processing device.

FIG. 2 is a block diagram showing hardware configurations of the information processing device 10.

As shown in FIG. 2, the information processing device 10 is configured to include a central processing unit (CPU) 11, a read-only memory (ROM) 12, a random-access memory (RAM) 13, a storage 14, an input unit 15, a display unit 16, and a communication interface (I/F) 17. These configurations are communicably connected to each other via a bus 19.

The CPU 11, which is an example of a hardware processor, is a central arithmetic processing unit, executes various types of programs, and controls each part of the information processing device 10. That is, the CPU 11 reads programs from the ROM 12 or the storage 14, which are examples of a memory, and executes the programs using the RAM 13 as a workspace. The CPU 11 controls each of the above configurations and performs various types of arithmetic processing in accordance with the programs recorded in the ROM 12 or the storage 14. In the present embodiment, an information processing program that acquires the correction value information from the server device 30 and sends the correction value information to the vehicle 20 is stored in the ROM 12 or the storage 14.

The ROM 12 stores various types of programs and various types of data. The RAM 13 temporarily stores programs or data as a workspace. The storage 14 is configured by a storage device such as a hard disk drive (HDD), a solid-state drive (SSD), or a flash memory, which are examples of non-transitory recording media, and stores various types of programs, including an operating system, and various types of data.

The input unit 15 includes a pointing device, such as a mouse, and a keyboard and is used to perform various types of input.

The display unit 16 is, for example, a liquid crystal display and displays various types of information. The display unit 16 may also employ a touch panel format and function as the input unit 15.

The communication interface 17 is an interface for communicating with other devices such as the vehicle 20 and the server device 30, and, for example, uses a standard such as Ethernet (registered trademark), FDDI, Wi-Fi (registered trademark), or BLE.

When executing the information processing program, the information processing device 10 uses the above hardware resources to realize various functions. Functional configurations realized by the information processing device 10 will now be described.

Figure 3:
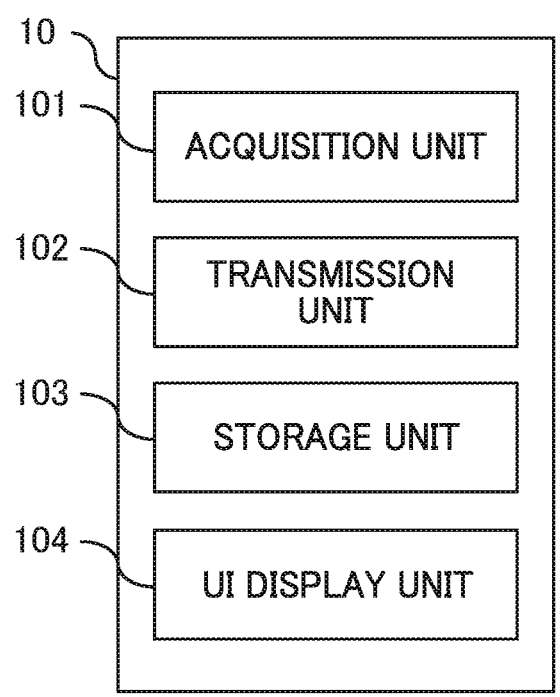
FIG. 3 is a block diagram showing an example of functional configurations of the information processing device.

FIG. 3 is a block diagram showing an example of functional configurations of the information processing device 10.

As shown in FIG. 3, the information processing device 10 has, as functional configurations, an acquisition unit 101, a transmission unit 102, a storage unit 103, and a UI display unit 104. These functional configurations are realized by the CPU 11 reading and executing the information processing program stored in the ROM 12 or the storage 14.

The acquisition unit 101, in a case where the information processing device 10 is not holding in the storage unit 103 the correction value information corresponding to its own model, acquires the correction value information corresponding to its own model from the server device 30. The acquisition unit 101 stores the correction value information it has acquired from the server device 30 in the storage unit 103. Information about the information processing device 10's own model is stored in the storage unit 103, for example.

The transmission unit 102 executes a process to send information to the vehicle 20. Specifically, the transmission unit 102 sends the correction value information corresponding to its own model stored in the storage unit 103 to the vehicle 20. In the present embodiment, the transmission unit 102 sends the correction value information corresponding to its own model to the vehicle 20 by wireless communication based on the BLE standard. As described later, the information processing device 10 can allow the user to customize the operating area. In a case where the operating area has been customized by the user, the transmission unit 102 sends a manually set value that has been set by the customization of the operating area to the vehicle 20.

The storage unit 103 stores various types of information used in the operation of the information processing device 10. In the present embodiment, the storage unit 103 stores the correction value information corresponding to its own model. Furthermore, in a case where the information processing device 10 functions as a digital key for the vehicle 20, the storage unit 103 stores key information used when unlocking the vehicle 20 and starting the engine.

The UI display unit 104 displays on the display unit 16 user interfaces for allowing the user to operate the information processing device 10. In the present embodiment, the UI display unit 104 displays on the display unit 16 a user interface for executing a process for causing the information processing device 10 to function as a digital key. Examples of user interfaces displayed on the display unit 16 by the UI display unit 104 will be described in detail later.

The information processing device 10 pertaining to the present embodiment can, by virtue of having these configurations, acquire the correction value information corresponding to its own model from the server device 30 and transmit the correction value information it has acquired to the vehicle 20. The vehicle 20 can, by receiving the correction value information from the information processing device 10, accurately execute the operating area determination process. Furthermore, the information processing device 10 can allow the vehicle 20 to accurately execute the operating area determination process without the need to store beforehand correction value information by model including even correction value information not corresponding to its own model.

(Vehicle)

Figure 4:
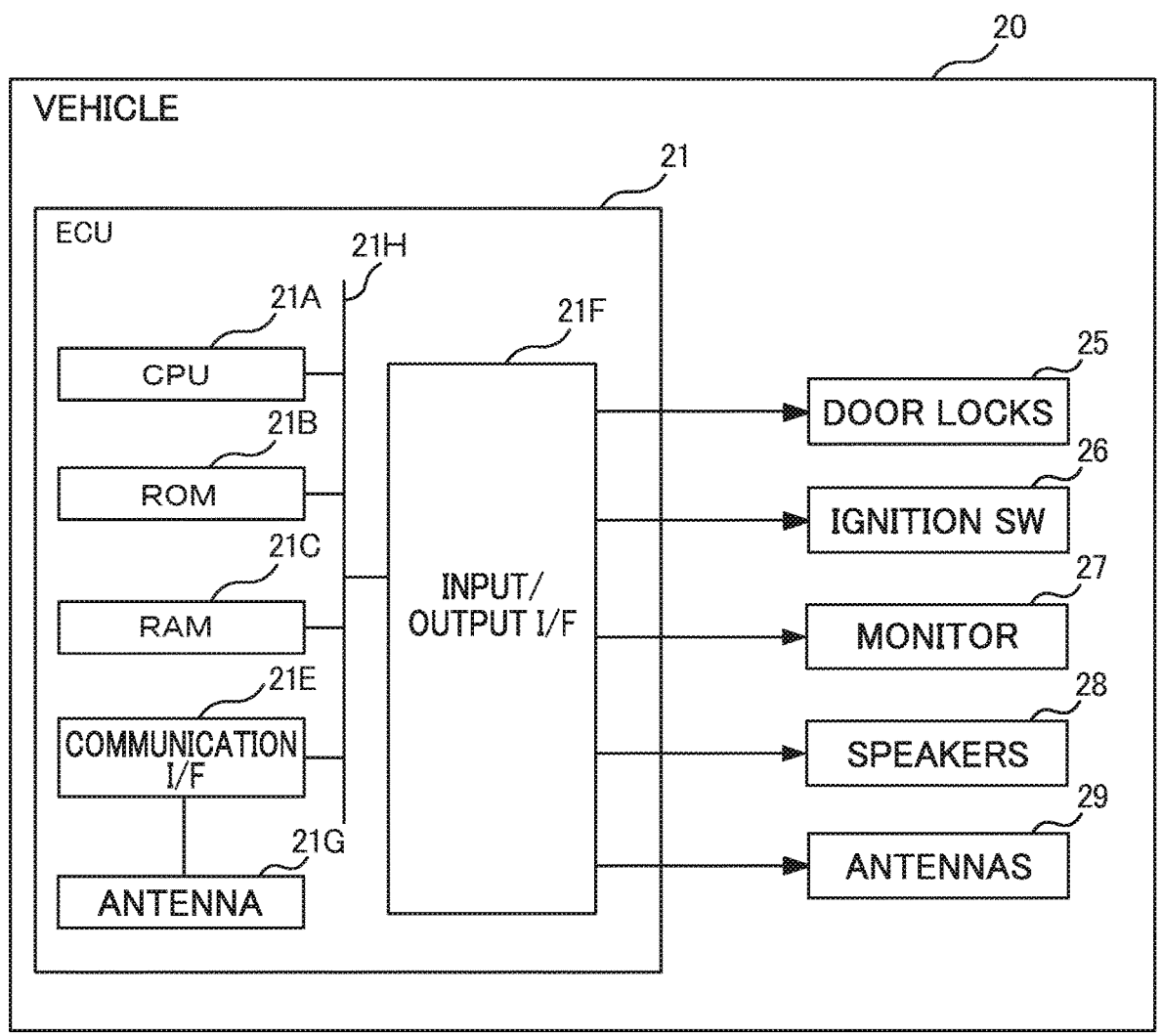
FIG. 4 is a diagram showing an example of hardware configurations of a vehicle.

FIG. 4 is a diagram showing an example of hardware configurations of the vehicle 20. As shown in FIG. 4, the vehicle 20 pertaining to the present embodiment is configured to include an ECU 21. The vehicle 20 is also configured to include door locks 25, an ignition switch (SW) 26, a monitor 27, speakers 28, and antennas 29.

The ECU 21 is configured to include a central processing unit (CPU) 21A, a read-only memory (ROM) 21B, a random-access memory (RAM) 21C, a wireless communication interface (I/F) 21E, an input/output I/F 21F, and an antenna 21G The CPU 21A, the ROM 21B, the RAM 21C, the wireless communication I/F 21E, and the input/output I/F 21F are communicably connected to each other via an internal bus 21H.

The CPU 21A, which is an example of a hardware processor, is a central arithmetic processing unit, executes various types of programs, and controls each part of the ECU 21. That is, the CPU 21A reads programs from the ROM 21B, which is an example of a memory, and executes the programs using the RAM 21C as a workspace.

The ROM 21B stores various types of programs and various types of data. In the ROM 21B of the present embodiment is stored a control program for controlling the ECU 21.

The RAM 21C temporarily stores programs or data as a workspace.

The wireless communication I/F 21E is a wireless communication module for communicating with the information processing device 10. The wireless communication module uses the BLE communication standard. The wireless communication I/F 21E is connected to the antenna 21G.

The input/output I/F 21F is an interface for communicating with the door locks 25, the ignition SW 26, the monitor 27, the speakers 28, and the antennas 29 installed in the vehicle 20.

The antenna 21G is an antenna that sends and receives wireless communication packets using BLE to and from the information processing device 10.

The door locks 25 are locks in doors of the vehicle 20, are locked and unlocked by the user riding in the vehicle 20, and are controlled to lock and unlock by the CPU 21A.

The ignition switch SW 26 is a switch for starting the engine of the vehicle 20, is switched on and off by the user riding in the vehicle 20, and is controlled on and off by the CPU 21A.

The monitor 27 is provided in an instrument panel or a meter panel, and is a liquid crystal monitor for displaying images pertaining to the current location, driving route, and advisory information. The monitor 27 may also be provided with a touch panel doubling as switches for the occupant to input operations using his/her fingers.

The speakers 28 are provided in the instrument panel, a center console, front pillars, and/or a dashboard, and are devices for outputting audio.

The antennas 29 are antennas for measuring the signal strength of the BLE packets sent by the information processing device 10. Whereas the antenna 21G of the ECU 21 is used for wireless communication with the information processing device 10, the antennas 29 are used for measuring the signal strength of the BLE packets sent by the information processing device 10. The antennas 29 are plurally provided in the vehicle 20. The antennas 29 can, for example, be provided in the front portion, the left side portion, and the right side portion of the vehicle 20. The CPU 21A uses the strength of the radio waves received by the antennas 29 to calculate the distance between the information processing device 10 and the vehicle 20 and to judge whether or not the information processing device 10 is in the cabin of the vehicle 20.

Although FIG. 4 shows a configuration where the one ECU 21 controls the devices of the vehicle 20, the disclosure is not limited to this example. For example, different ECUs may also control the door locks 25 and the ignition switch 26.

Next, functional configurations realized by the vehicle 20 will be described.

Figure 5:
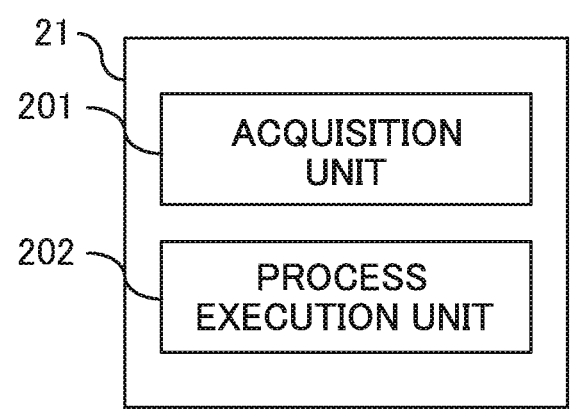
FIG. 5 is a block diagram showing an example of functional configurations of the vehicle.

FIG. 5 is a block diagram showing an example of functional configurations of the vehicle 20.

As shown in FIG. 5, the vehicle 20 has, as functional configurations, an acquisition unit 201 and a process execution unit 202. These functional configurations are realized by the CPU 21A reading and executing the information processing program stored in the ROM 21B.

The acquisition unit 201 acquires from the information processing device 10 functioning as a digital key for the vehicle 20 information relating to the process pertaining to the digital key. For example, the acquisition unit 201 acquires from the information processing device 10 the correction value information corresponding to the model of the information processing device 10.

The process execution unit 202 executes various processes pertaining to the operation of the vehicle 20. For example, the process execution unit 202 executes the process pertaining to the digital key. When executing the process pertaining to the digital key, the process execution unit 202 executes the operating area determination process. When executing the operating area determination process, the process execution unit 202 uses the correction value information sent from the information processing device 10 to correct the operating area and then executes the operating area determination process.

(Action)

Next, the action of the information processing device 10 will be described.

Figure 6:
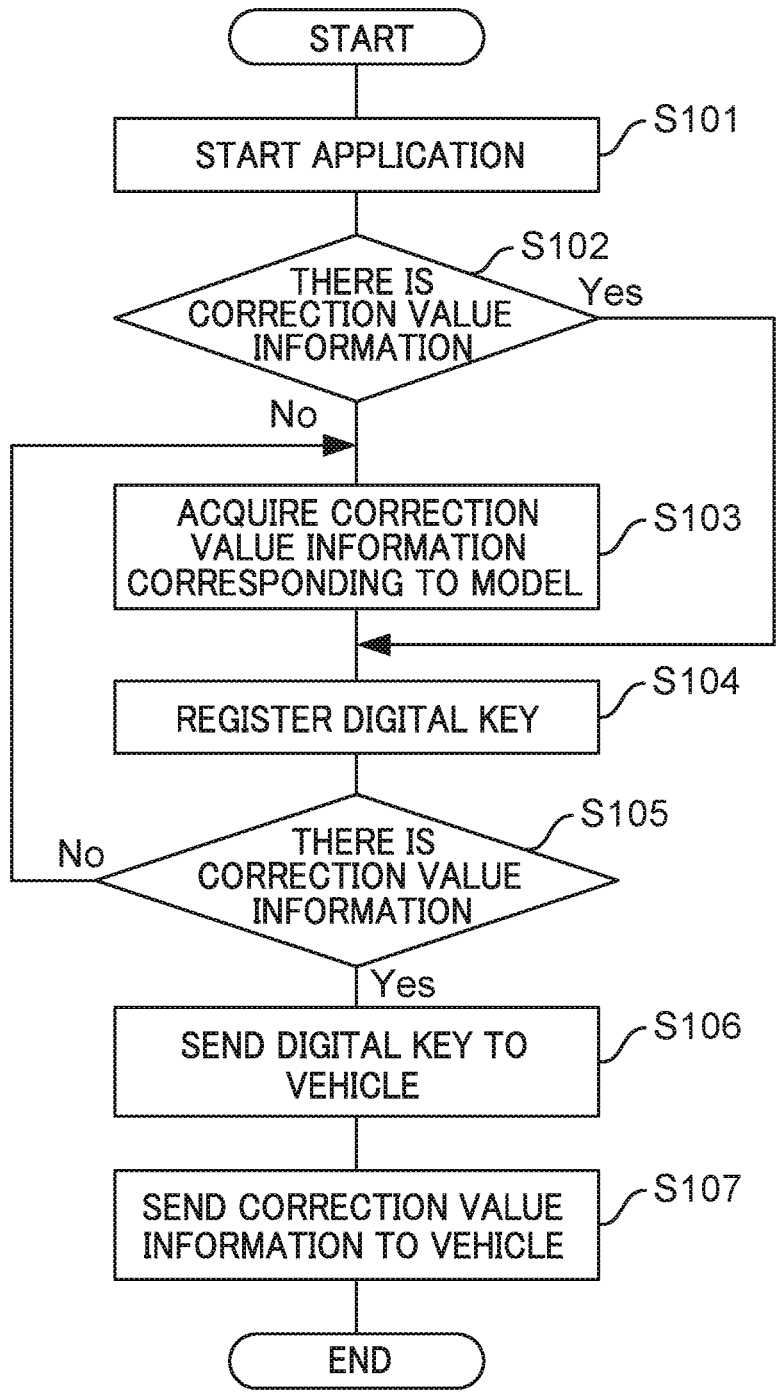
FIG. 6 is a flowchart showing an example of a flow of information processing performed by the information processing device.

FIG. 6 is a flowchart showing a flow of information processing performed by the information processing device 10. The information processing is performed by the CPU 11 reading the information processing program from the ROM 12 or the storage 14, transferring it to the RAM 13, and executing it. The flowchart shown in FIG. 6 shows a flow of processes performed by the information processing device 10 when causing the information processing device 10 to function as a digital key for the vehicle 20.

First, in step S101 the CPU 11 starts the application for causing the information processing device 10 to function as a digital key for the vehicle 20.

When the CPU 11 starts the application, next, in step S102, the CPU 11 judges whether or not the information processing device 10 is holding the correction value information corresponding to its own model.

In a case where, as a result of the judgment in step S102, the information processing device 10 is not holding the correction value information corresponding to its own model (step S102: NO), next, in step S103 the CPU 11 acquires the correction value information corresponding to its own model from the server device 30. In a case where, as a result of the judgment in step S102, the information processing device 10 is holding the correction value information corresponding to its own model (step S102: YES), the CPU 11 skips the process of step S103.

Figure 7:
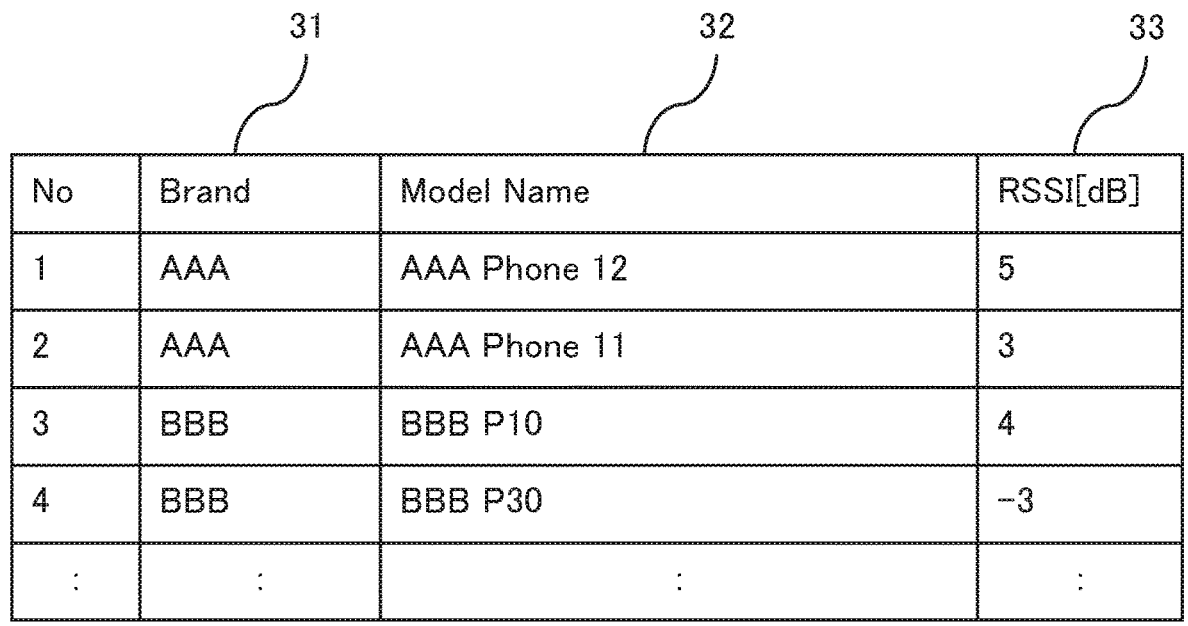
FIG. 7 is a diagram showing an example of correction value information by model of information processing devices held by a server device.

FIG. 7 is a diagram showing an example of correction value information by model of the information processing device 10 held by the server device 30. Reference sign 31 denotes a column in which manufacturers of the information processing device 10 are stored. Reference sign 32 denotes a column in which model names of the information processing device 10 are stored. Reference sign 33 denotes a column in which correction value information corresponding to the models is stored. The correction value information is, for example, stored as RSSI (Received Signal Strength Indicator) correction values as shown in FIG. 7. For example, the RSSI listed for model no. 1 means that the vehicle 20 is made to execute the operating area determination process after increasing by 5 [dB] the RSSI of the radio waves sent by BLE from the information processing device 10.

Next, in step S104 the CPU 11 moves to a mode for registering the digital key in the vehicle 20. When the CPU 11 moves to the mode for registering the digital key, next, in step S105 the CPU 11 judges whether or not the information processing device 10 is holding the correction value information corresponding to its own model.

In a case where, as a result of the judgment in step S105, the information processing device 10 is not holding the correction value information corresponding to its own model (step S105: NO), next, the CPU 11 returns to step S103 and acquires the correction value information corresponding to its own model from the server device 30. Here, possible cases where the information processing device 10 is not holding the correction value information corresponding to its own model may include a case where the CPU 11 has moved to the mode for registering the digital key even though it was unable to acquire the correction value information corresponding to its own model from the server device 30 in step S103.

In a case where, as a result of the judgment in step S105, the information processing device 10 is holding the correction value information corresponding to its own model (step S105: YES), next, in step S106 the CPU 11 registers the digital key in the vehicle 20. Specifically, the CPU 11 register the digital key in the vehicle 20 by sending the digital key to the vehicle 20 by wireless communication based on the BLE standard.

When the CPU 11 registers the digital key in the vehicle 20, next, in step S107 the CPU 11 sends the correction value information corresponding to its own model to the vehicle 20.

The information processing device 10 can, by executing this series of processes, acquire the correction value information corresponding to its own model from the server device 30 and send the correction value information it has acquired to the vehicle 20. The vehicle 20 can, by receiving the correction value information from the information processing device 10, accurately execute the operating area determination process. Furthermore, the information processing device 10 can allow the vehicle 20 to accurately execute the operating area determination process without the need to store beforehand correction value information by model including even correction value information not corresponding to its own model.

Figure 8:
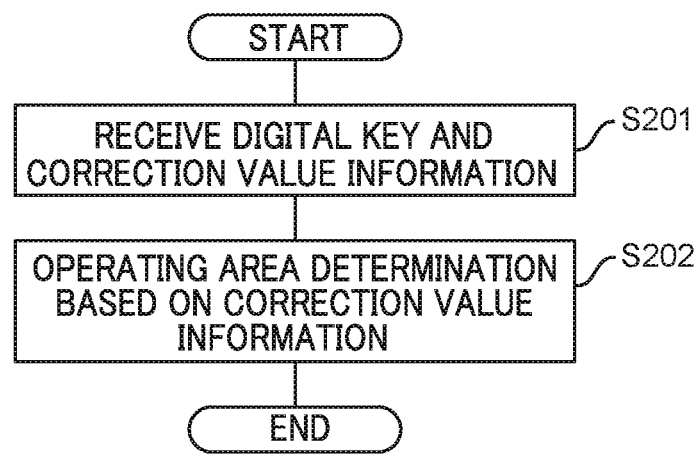
FIG. 8 is a flowchart showing an example of a flow of information processing performed by the vehicle.

FIG. 8 is a flowchart showing a flow of information processing performed by the vehicle 20. The information processing is performed by the CPU 21A reading the information processing program stored in the ROM 21B, transferring it to the RAM 21C, and executing it. The flowchart shown in FIG. 8 shows a flow of processes performed by the vehicle 20 when causing the information processing device 10 to function as a digital key for the vehicle 20.

First, in step S201 the CPU 21A receives the digital key and the correction value information from the information processing device 10 attempting to operate as a digital key.

When the CPU 21A receives the digital key and the correction value information from the information processing device 10, next, in step S202 the CPU 21A connects to the information processing device 10 registered as a digital key and uses the correction value information it has received to execute the operating area determination process relating to the information processing device 10.

The vehicle 20 can, by executing this series of processes, use the correction value information it has received from the information processing device 10 to accurately execute the operating area determination process relating to the information processing device 10.

Second Embodiment (System Configuration)

Figure 9:
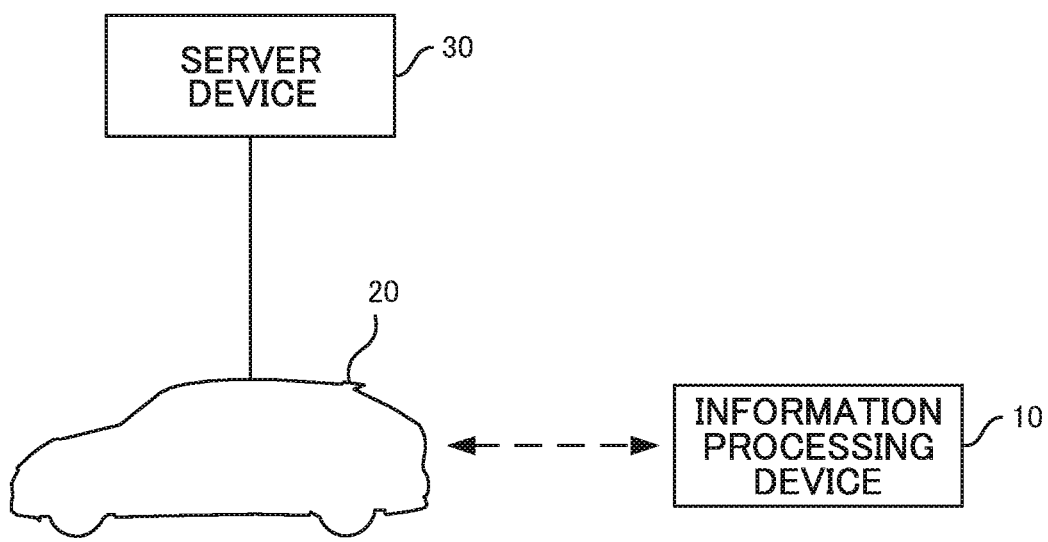
FIG. 9 is a diagram showing the schematic configuration of an example of a vehicle control system pertaining to a second embodiment.

FIG. 9 is a diagram showing the schematic configuration of a vehicle control system 1 pertaining to a second embodiment of the disclosure. The vehicle control system 1 shown in FIG. 9 is configured to include an information processing device 10, a vehicle 20, and a server device 30.

The vehicle control system 1 pertaining to the second embodiment differs from the vehicle control system 1 of the first embodiment in that it is the vehicle 20 that acquires the correction value information from the server device 30. Because the vehicle 20 acquires the correction value information from the server device 30, the vehicle 20 can be allowed to accurately execute the operating area determination process using the correction value information even in a case where the information processing device 10 is unable to connect to its network and acquire the correction value information from the server device 30.

Figure 10:
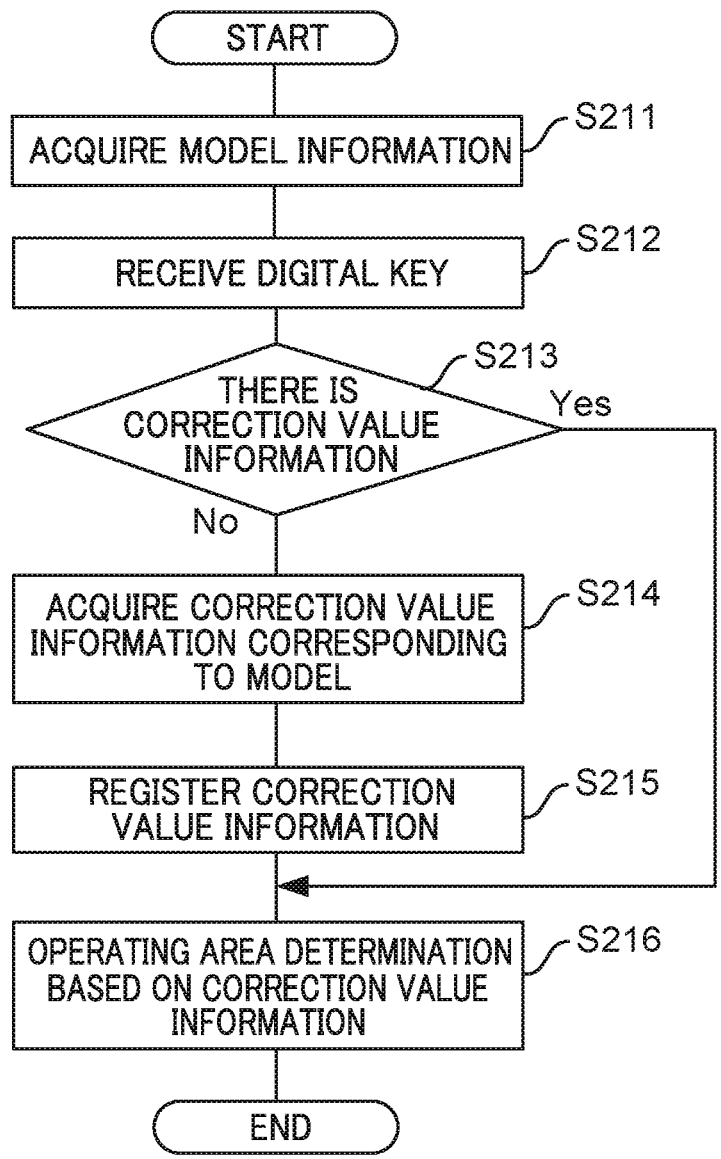
FIG. 10 is a flowchart showing an example of a flow of information processing performed by the vehicle.

FIG. 10 is a flowchart showing a flow of information processing performed by the vehicle 20. The information processing is performed by the CPU 21A reading the information processing program stored in the ROM 21B, transferring it to the RAM 21C, and executing it. The flowchart shown in FIG. 10 shows a flow of processes performed by the vehicle 20 when causing the information processing device 10 to function as a digital key for the vehicle 20.

In step S211 the CPU 21A acquires the model information of the information processing device 10 from the information processing device 10 attempting to operate as a digital key.

When the CPU 21A acquires the model information of the information processing device 10, next, in step S212 the CPU 21A receives the digital key from the information processing device 10.

When the CPU 21A receives the digital key from the information processing device 10, next, the CPU 21A performs the operating area determination process relating to the information processing device 10. When performing the operating area determination process, in step S213 the CPU 21A judges whether or not the correction value information corresponding to the model of the information processing device 10 exists in the ECU 21 of the vehicle 20.

In a case where, as a result of the judgment in step S213, the correction value information corresponding to the model of the information processing device 10 does not exist in the ECU 21 of the vehicle 20 (step S213: NO), in step S214 the CPU 21A acquires the correction value information corresponding to the model of the information processing device 10 from the server device 30. Next, the CPU 21A registers the correction value information in the ECU 21. For example, the CPU 21A registers the correction value information in the ECU 21 by storing it in the RAM 21C.

In a case where, as a result of the judgment in step S213, the correction value information corresponding to the model of the information processing device 10 exists in the ECU 21 of the vehicle 20 (step S213: YES), the CPU 21A skips the processes of steps S214 and S215.

When the CPU 21A receives the digital key from the information processing device 10 and registers the correction value information, next, in step S216 the CPU 21A connects to the information processing device 10 registered as a digital key and uses the correction value information it has registered to execute the operating area determination process relating to the information processing device 10.

The vehicle 20 can, by executing this series of processes, use the correction value information corresponding to the model of the information processing device 10 it has received from the server device 30 to accurately execute the operating area determination process relating to the information processing device 10.

Third Embodiment

In the first embodiment, when the information processing device 10 registered the digital key in the vehicle 20, acquiring the correction value information from the server device 30 was mandatory. However, in a case where, for example, the information processing device 10 is unable to connect via its network to the server device 30 and/or the server device 30 is not operating, the information processing device 10 cannot register the digital key in the vehicle 20 no matter how much time passes. Furthermore, also in cases where the correction value information corresponding to the model of the information processing device 10 is not registered in the server device 30, such as right after the information processing device 10 comes onto the market, the information processing device 10 cannot register the digital key in the vehicle 20 no matter how much time passes.

Thus, in a third embodiment of the disclosure, in a case where the information processing device 10 is unable to acquire the correction value information from the server device 30, the information processing device 10 sends a predetermined default value as the correction value information to the vehicle 20. By sending the predetermined default value as the correction value information to the vehicle 20, the information processing device 10 can register the digital key in the vehicle 20 even in a case where, for example, the information processing device 10 is unable to connect via its network to the server device 30 and/or the server device 30 is not operating.

Figure 11:
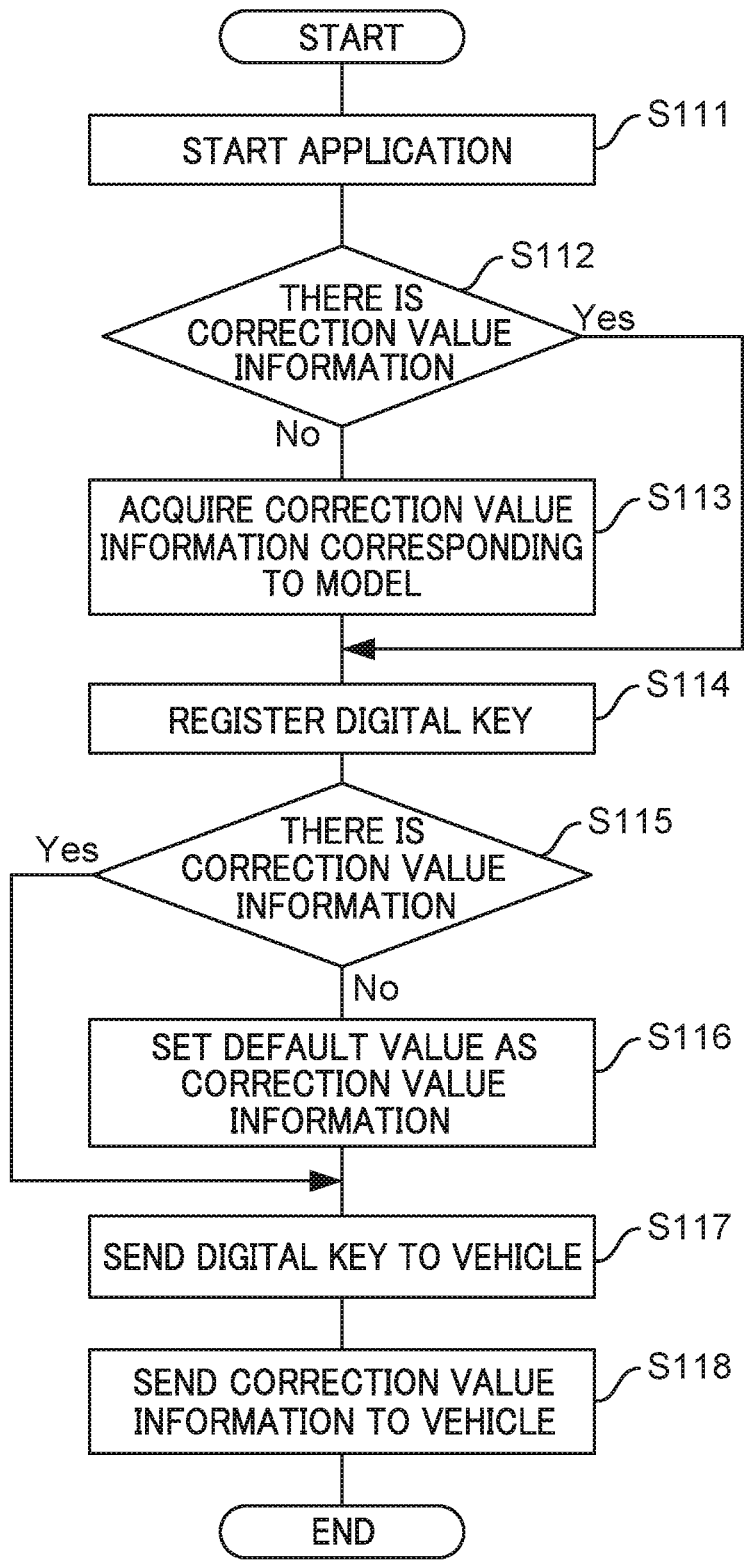
FIG. 11 is a flowchart showing an example of a flow of information processing performed by the information processing device.

FIG. 11 is a flowchart showing a flow of information processing performed by the information processing device 10. The information processing is performed by the CPU 11 reading the information processing program from the ROM 12 or the storage 14, transferring it to the RAM 13, and executing it. The flowchart shown in FIG. 11 shows a flow of processes performed by the information processing device 10 when causing the information processing device 10 to function as a digital key for the vehicle 20.

First, in step S111 the CPU 11 starts the application for causing the information processing device 10 to function as a digital key for the vehicle 20.

When the CPU 11 starts the application, next, in step S112 the CPU 11 judges whether or not the information processing device 10 is holding the correction value information corresponding to its own model.

In a case where, as a result of the judgment in step S112, the information processing device 10 is not holding the correction value information corresponding to its own model (step S112: NO), next, in step S113 the CPU 11 acquires the correction value information corresponding to its own model from the server device 30. In a case where, as a result of the judgment in step S112, the information processing device 10 is holding the correction value information corresponding to its own model (step S112: YES), the CPU 11 skips the process of step S113.

Next, in step S114 the CPU 11 moves to the mode for registering the digital key in the vehicle 20. When the CPU 11 moves to the mode for registering the digital key, next, in step S115 the CPU 11 judges whether or not the information processing device 10 is holding the correction value information corresponding to its own model.

In a case where, as a result of the judgment in step S115, the information processing device 10 is not holding the correction value information corresponding to its own model (step S115: NO), next, in step S116 the CPU 11 sets the predetermined default value as the correction value information.

In a case where, as a result of the judgment in step S115, the information processing device 10 is holding the correction value information corresponding to its own model (step S116: YES), the CPU 11 skips the process of step S116.

Next, in step S117 the CPU 11 registers the digital key in the vehicle 20. Specifically, the CPU 11 registers the digital key in the vehicle 20 by sending the digital key to the vehicle 20 by wireless communication based on the BLE standard.

When the CPU 11 registers the digital key in the vehicle 20, next, in step S118 the CPU 11 sends the correction value information corresponding to its own model to the vehicle 20.

The information processing device 10 can, by executing this series of processes, acquire the correction value information corresponding to its own model from the server device 30 and send the correction value information it has acquired to the vehicle 20. The vehicle 20 can, by receiving the correction value information from the information processing device 10, accurately execute the operating area determination process. Furthermore, the information processing device 10 can allow the vehicle 10 to accurately execute the operating area determination process without the need to store beforehand correction value information by model including even correction value information not corresponding to its own model.

Furthermore, the information processing device 10 can, by executing this series of processes, register the correction value information in the vehicle 20 even in a case where the information processing device 10 is unable to acquire the correction value information corresponding to its own model from the server device 30.

(User Interfaces)

Figure 12:
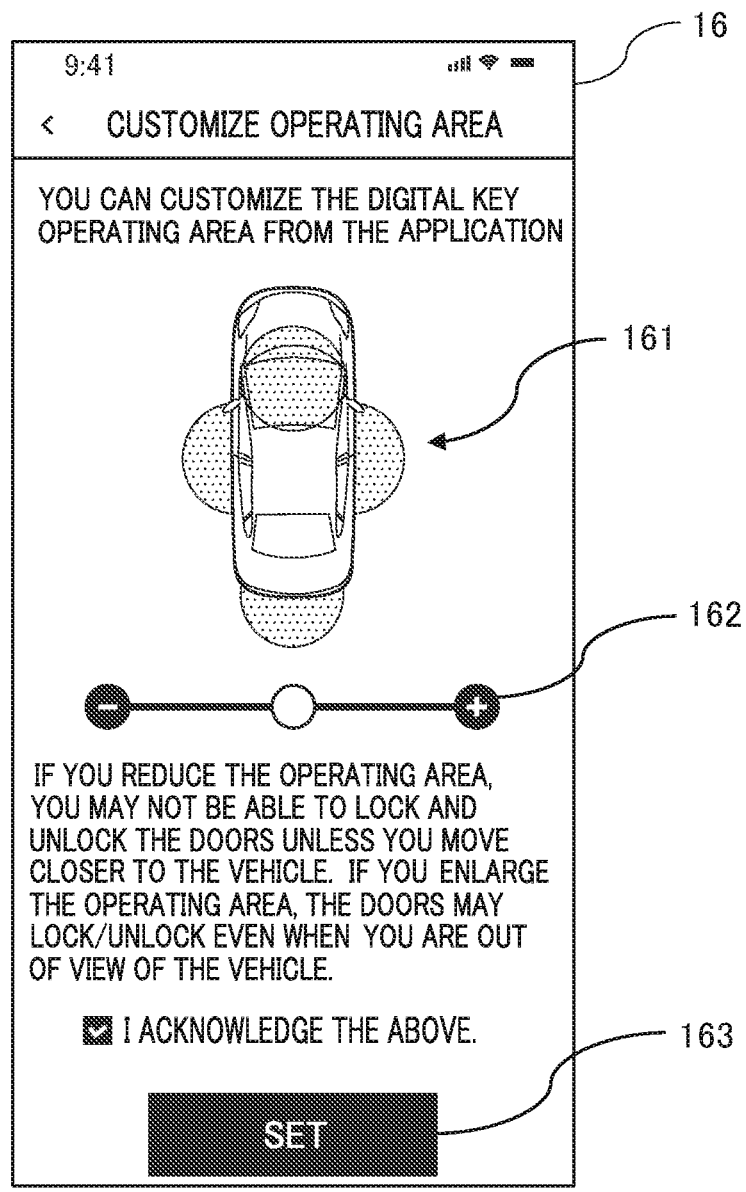
FIG. 12 is a drawing showing an example of a user interface displayed by the information processing device.

Next, examples of user interfaces that the information processing device 10 displays on the display unit 16 will be described. FIG. 12 is a drawing showing an example of a user interface that the information processing device 10 displays on the display unit 16.

What FIG. 12 shows is an example of a user interface that the information processing device 10 displays on the display unit 16 when allowing the user to customize the operating area. Reference sign 161 is an illustration visually showing the operating area, and reference sign 162 is a slide bar for allowing the user to change the operating area. Reference sign 163 is a button for setting the operating area customization result in the vehicle 20. By sliding the slide bar left, the operating area becomes smaller, and by sliding the slide bar right, the operating area becomes larger. The customization of the operating area is settable in five stages, for example, and a manually set value is decided in accordance with the stage. The RSSI value used during the determination of the operating area by the vehicle 20 is changed by the manually set value.

Figure 13:
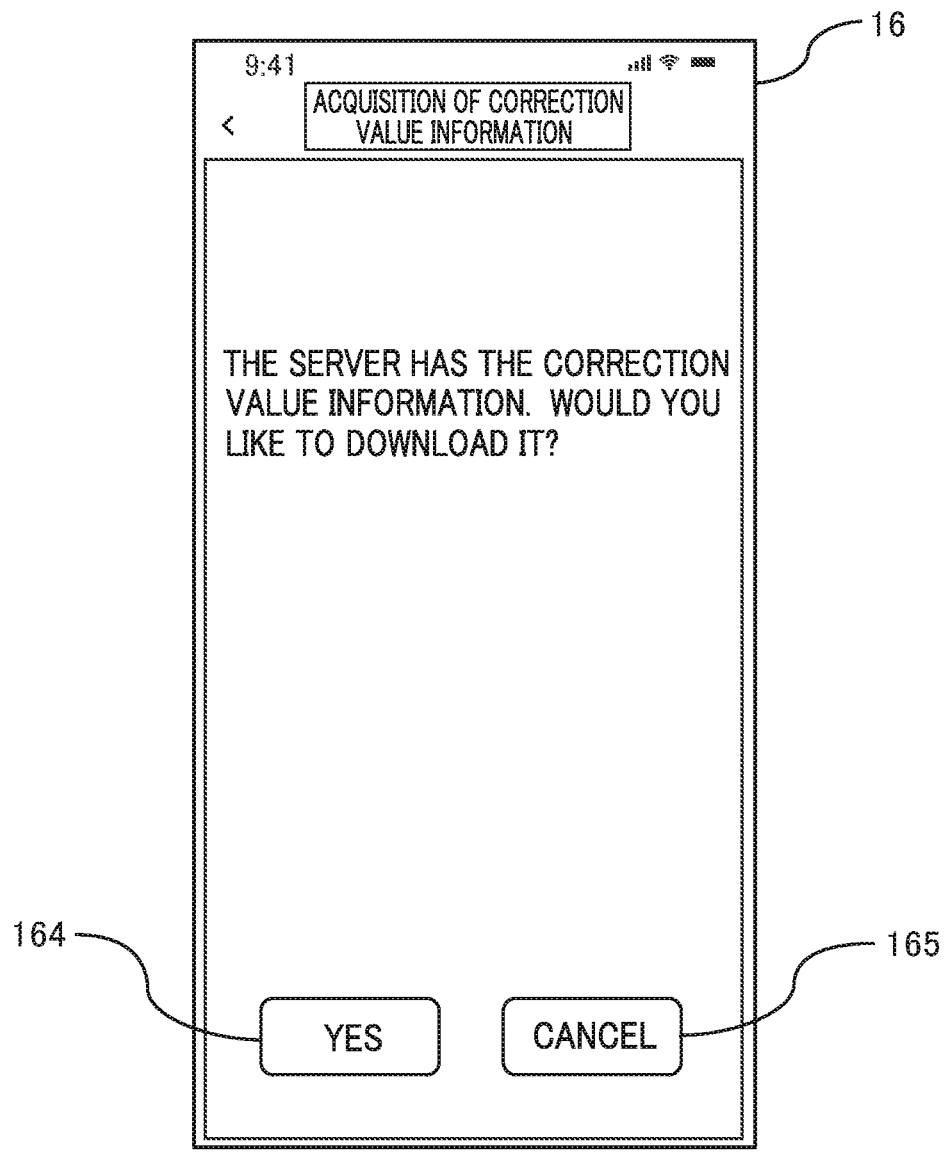
FIG. 13 is a drawing showing an example of a user interface displayed by the information processing device.

FIG. 13 is a drawing showing an example of a user interface that the information processing device 10 displays on the display unit 16.

What FIG. 13 shows is an example of a user interface that allows the user to decide whether or not to download the correction value information from the server device 30.

Reference sign 164 denotes a button for downloading the correction value information from the server device 30. Furthermore, reference sign 165 denotes a button for returning to the previous screen without downloading the correction value information from the server device 30. When the user selects the button denoted by reference sign 164, the information processing device 10 downloads the correction value information corresponding to the model of the information processing device 10 from the server device 30.

There can be cases where, right after the information processing device 10 comes onto the market, the correction value information corresponding to the model of the information processing device 10 is not registered in the server device 30 but thereafter becomes registered in the server device 30. In such cases, the information processing device 10 acquires, with the acquisition unit 101 from the server device 30, a notification that the correction value information corresponding to the model of the information processing device 10 has been registered in the server device 30. By displaying a user interface such as shown in FIG. 13 in accompaniment with the acquisition of the notification, the information processing device 10 can notify the user that the correction value information corresponding to the model of the information processing device 10 has been registered in the server device 30. Furthermore, by displaying a user interface such as shown in FIG. 13 on the display unit 16, the information processing device 10 can allow the user to download the correction value information that has been registered in the server device 30.

In the above embodiments, the vehicle 20 was described as a vehicle that is driven by causing an engine to operate using gasoline for power, but the disclosure is not limited to this example. The vehicle 20 may also be an electric vehicle such as a hybrid electric vehicle (HEV), a plug-in hybrid electric vehicle (PHEV), a fuel cell electric vehicle (FCEV), or a battery electric vehicle (BEV).

It will be noted that the information processing that the CPUs executed by reading software (a program) in each of the above embodiments may also be executed by various types of processors other than CPUs. Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the information processing may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in each of the above embodiments, the information processing program was described as being stored (installed) beforehand in a ROM or a storage, but the program is not limited to this. The program may also be provided in a form in which it is recorded in a non-transitory recording medium such as a compact disc read-only memory (CD-ROM), a digital versatile disc read-only memory (DVD-ROM), and a universal serial bus (USB) memory. Furthermore, the program may also take a form in which it is downloaded via a network from an external device.

The present disclosure provides an information processing device, a vehicle, an information processing method, and a non-transitory computer-readable recording medium in which a computer program is recorded, which can allow a vehicle to accurately determine the distance between devices without the need to have it store beforehand correction value information by model.

A first aspect of the disclosure is an information processing device utilizable as a digital key for a vehicle. The information processing device includes a memory, and a processor coupled to the memory, the processor being configured to in a case in which the processor does not have signal strength correction value information corresponding to a model of the information processing device, the correction value information being used by the vehicle when determining a distance between the vehicle and the information processing device in processing pertaining to the digital key for the vehicle, acquire the correction value information from a server device, and send the acquired correction value information to the vehicle.

According to the first aspect of the disclosure, if the processor is not holding the correction value information, it acquires the correction value information from the server device, whereby the processor can allow the vehicle to accurately determine the distance between devices without the need to have it store beforehand correction value information by model.

A second aspect of the disclosure is the information processing device of the first aspect, wherein the processor is configured to send predetermined correction value information to the vehicle in a case in which the processor was unable to acquire the correction value information from the server device.

According to the second aspect of the disclosure, the processor can allow the vehicle to accurately determine the distance between devices using the predetermined correction value information.

A third aspect of the disclosure is the information processing device of the first aspect, wherein the processor is configured to send to the vehicle, in addition to the correction value information, a manually set value that has been set by a user and that is configured to correct the signal strength.

According to the third aspect of the disclosure, the processor can, by reflecting in the correction value information the manually set value that has been set by the user, allow the vehicle to accurately determine the distance between devices.

A fourth aspect of the disclosure is the information processing device of the first aspect, wherein the processor is configured to acquire a notification that the correction value information corresponding to the model of the information processing device has been registered at the server device.

According to the fourth aspect of the disclosure, the processor can allow the user of the information processing device to grasp that the correction value information corresponding to the model of the information processing device has been registered in the server device.

A fifth aspect of the disclosure is the information processing device of the first aspect, wherein the memory is configured to store key information relating to the digital key.

According to the fifth aspect of the disclosure, the information processing device can function as a digital key for the vehicle.

A sixth aspect of the disclosure is the information processing device of the first aspect, wherein the processing pertaining to the digital key is processing for unlocking the vehicle.

According to the sixth aspect of the disclosure, the information processing device can function as a digital key that can unlock the vehicle.

A seventh aspect of the disclosure is a vehicle which includes a memory and a processor connected to the memory. The processor is configured to in a case in which the processor does not have signal strength correction value information corresponding to a model of an information processing device utilizable as a digital key for the vehicle, the correction value information being used by the processor when determining a distance between the vehicle and the information processing device in processing pertaining to the digital key for the vehicle, acquire the correction value information from a server device; and execute the processing pertaining to the digital key based on a result of determining the distance between the vehicle and the information processing device using the acquired correction value information.

According to the seventh aspect of the disclosure, if the processor is not holding the correction value information, it acquires the correction value information from the server device, whereby the processor can accurately determine the distance between devices without the need to store beforehand correction value information by model.

An eighth aspect of the disclosure is the vehicle of the seventh aspect, wherein the processor is configured to determine the distance between the vehicle and the information processing device using predetermined correction value information in a case in which the processor was unable to acquire the correction value information from the server device.

According to the eighth aspect of the disclosure, the processor can accurately determine the distance between devices using the predetermined value information.

A ninth aspect of the disclosure is the vehicle of the seventh aspect, wherein the processor is configured to acquire a notification that the correction value information corresponding to the model of the information processing device has been registered at the server device.

According to the ninth aspect of the disclosure, the processor can allow the user of the vehicle to grasp that the correction value information corresponding to the model of the information processing device has been registered in the server device.

A tenth aspect of the disclosure is the vehicle of the seventh aspect, wherein the processing pertaining to the digital key for the vehicle is processing for unlocking the vehicle.

According to the tenth aspect of the disclosure, the processor can accurately determine the distance between the vehicle and the information processing device functioning as a digital key that can unlock the vehicle.

An eleventh aspect of the disclosure is an information processing method that includes using a processor to in a case in which the processor does not have signal strength correction value information corresponding to a model of an information processing device utilizable as a digital key for a vehicle, the correction value information being used by the vehicle when determining a distance between the vehicle and the information processing device in processing pertaining to the digital key for the vehicle, acquire the correction value information from a server device, and send the acquired correction value information to the vehicle.

According to the eleventh aspect of the disclosure, if the processor is not holding the correction value information, it acquires the correction value information from the server device, whereby the processor can allow the vehicle to accurately determine the distance between devices without the need to have it store beforehand correction value information by model.

A twelfth aspect of the disclosure is an information processing method that includes using a processor to in a case in which the processor does not have signal strength correction value information corresponding to a model of an information processing device utilizable as a digital key for a vehicle, the correction value information being used by the processor when determining a distance between the vehicle and the information processing device in processing pertaining to the digital key for the vehicle, acquire the correction value information from a server device, and execute the processing pertaining to the digital key for the vehicle based on a result of determining the distance between the vehicle and the information processing device using the acquired correction value information.

According to the twelfth aspect of the disclosure, if the processor is not holding the correction value information, it acquires the correction value information from the server device, whereby the processor can accurately determine the distance between devices without the need to store beforehand correction value information by model.

A thirteenth aspect of the disclosure is a non-transitory recording medium storing a program that is executable by a computer to perform processing, the processing includes in a case in which the processor does not have signal strength correction value information corresponding to a model of an information processing device utilizable as a digital key for a vehicle, the correction value information being used by the vehicle when determining a distance between the vehicle and the information processing device in a process pertaining to the digital key for the vehicle, acquiring the correction value information from a server device, and sending the acquired correction value information to the vehicle.

According to the thirteenth aspect of the disclosure, if the processor is not holding the correction value information, it acquires the correction value information from the server device, whereby the processor can allow the vehicle to accurately determine the distance between devices without the need to have it store beforehand correction value information by model.

A fourteenth aspect of the disclosure is a non-transitory recording medium storing a program that is executable by a computer to perform processing, the processing includes in a case where the processor does not have signal strength correction value information corresponding to a model of an information processing device utilizable as a digital key for a vehicle, the correction value information being used by the processor when determining a distance between the vehicle and the information processing device in a process pertaining to the digital key for the vehicle, acquiring the correction value information from a server device, and executing the process pertaining to the digital key for the vehicle based on a result of determining the distance between the vehicle and the information processing device using the acquired correction value information.

According to the fourteenth aspect of the disclosure, if the processor is not holding the correction value information, it acquires the correction value information from the server device, whereby the processor can accurately determine the distance between devices without the need to store beforehand correction value information by model.

According to the present disclosure, there can be provided an information processing device, a vehicle, an information processing method, and a non-transitory recording medium in which computer program is recorded which, by acquiring correction value information from a server device, can allow a vehicle to accurately determine the distance between devices without the need to have it store beforehand correction value information by model.

What is claimed is:

1. An information processing device utilizable as a digital key for a vehicle, the information processing device comprising:
a memory; and
a processor coupled to the memory, the processor being configured to:
in a case in which the processor does not have signal strength correction value information corresponding to a model of the information processing device, the correction value information being used by the vehicle when determining a distance between the vehicle and the information processing device in processing pertaining to the digital key for the vehicle, acquire the correction value information from a server device; and
send the acquired correction value information to the vehicle.

2. The information processing device of claim 1, wherein the processor is configured to send predetermined correction value information to the vehicle in a case in which the processor was unable to acquire the correction value information from the server device.

3. The information processing device of claim 1, wherein the processor is configured to send to the vehicle, in addition to the correction value information, a manually set value that has been set by a user and that is configured to correct the signal strength.

4. The information processing device of claim 1, wherein the processor is configured to acquire a notification that the correction value information corresponding to the model of the information processing device has been registered at the server device.

5. The information processing device of claim 1, wherein the memory is configured to store key information relating to the digital key.

6. The information processing device of claim 1, wherein the processing pertaining to the digital key is processing for unlocking the vehicle.

7. A vehicle, comprising:
a memory; and
a processor coupled to the memory, the processor being configured to:
in a case in which the processor does not have signal strength correction value information corresponding to a model of an information processing device utilizable as a digital key for the vehicle, the correction value information being used by the processor when determining a distance between the vehicle and the information processing device in processing pertaining to the digital key for the vehicle, acquire the correction value information from a server device; and
execute the processing pertaining to the digital key based on a result of determining the distance between the vehicle and the information processing device using the acquired correction value information.

8. The vehicle of claim 7, wherein the processor is configured to determine the distance between the vehicle and the information processing device using predetermined correction value information in a case in which the processor was unable to acquire the correction value information from the server device.

9. The vehicle of claim 7, wherein the processor is configured to acquire a notification that the correction value information corresponding to the model of the information processing device has been registered at the server device.

10. The vehicle of claim 7, wherein the processing pertaining to the digital key for the vehicle is processing for unlocking the vehicle.

11. An information processing method, comprising using a processor to:
in a case in which the processor does not have signal strength correction value information corresponding to a model of an information processing device utilizable as a digital key for a vehicle, the correction value information being used by the vehicle when determining a distance between the vehicle and the information processing device in processing pertaining to the digital key for the vehicle, acquire the correction value information from a server device; and send the acquired correction value information to the vehicle.

12. An information processing method, comprising using a processor to:

in a case in which the processor does not have signal strength correction value information corresponding to a model of an information processing device utilizable as a digital key for a vehicle, the correction value information being used by the processor when determining a distance between the vehicle and the information processing device in processing pertaining to the digital key for the vehicle, acquire the correction value information from a server device; and execute the processing pertaining to the digital key for the vehicle based on a result of determining the distance between the vehicle and the information processing device using the acquired correction value information.

13. A non-transitory recording medium storing a computer program executable by a computer to perform processing, the processing comprising:

in a case in which a processor does not have signal strength correction value information corresponding to a model of an information processing device utilizable as a digital key for a vehicle, the correction value information being used by the vehicle when determining a distance between the vehicle and the information processing device in a process pertaining to the digital key for the vehicle, acquiring the correction value information from a server device; and sending the acquired correction value information to the vehicle.

14. A non-transitory recording medium storing a computer program executable by a computer to perform processing, the processing comprising:

in a case where a processor does not have signal strength correction value information corresponding to a model of an information processing device utilizable as a digital key for a vehicle, the correction value information being used by the processor when determining a distance between the vehicle and the information processing device in a process pertaining to the digital key for the vehicle, acquiring the correction value information from a server device; and executing the process pertaining to the digital key for the vehicle based on a result of determining the distance between the vehicle and the information processing device using the acquired correction value information.

* * * * *